US012623753B2

(12) United States Patent
Van Druten

(10) Patent No.: US 12,623,753 B2
(45) Date of Patent: May 12, 2026

(54) SYSTEM AND METHOD FOR CHANGING A BICYCLE TRANSMISSION RATIO OF A BICYCLE TRANSMISSION

(71) Applicant: CLASSIFIED CYCLING BV, Antwerp (BE)

(72) Inventor: Roëll Marie Van Druten, Eindhoven (NL)

(73) Assignee: CLASSIFIED CYCLING B.V., Antwerp (BE)

( * ) Notice: Subject to any disclaimer, the term of this patent is extended or adjusted under 35 U.S.C. 154(b) by 0 days.

(21) Appl. No.: 18/574,619

(22) PCT Filed: Jun. 28, 2022

(86) PCT No.: PCT/EP2022/067767
§ 371 (c)(1),
(2) Date: Dec. 27, 2023

(87) PCT Pub. No.: WO2023/275072
PCT Pub. Date: Jan. 5, 2023

(65) Prior Publication Data
US 2024/0294229 A1    Sep. 5, 2024

(30) Foreign Application Priority Data
Jun. 28, 2021    (NL) ...................................... 2028558

(51) Int. Cl.
*B62M 9/122*       (2010.01)
*B62M 11/16*       (2006.01)
*B62M 25/04*       (2006.01)
(52) U.S. Cl.
CPC .............. *B62M 9/122* (2013.01); *B62M 11/16* (2013.01)
(58) Field of Classification Search
CPC ......... B62M 9/00; B62M 11/00; B62M 25/00
See application file for complete search history.

(56) References Cited

U.S. PATENT DOCUMENTS

| | | | |
|---|---|---|---|
| 7,281,489 B2 | 10/2007 | Kawakami | |
| 2014/0290411 A1* | 10/2014 | Kuroda .................. | B62M 9/122 |
| | | | 74/473.12 |

(Continued)

FOREIGN PATENT DOCUMENTS

| | | |
|---|---|---|
| WO | 2018/199757 A2 | 11/2018 |
| WO | 2020/085911 A2 | 4/2020 |
| WO | 2021/080431 A1 | 4/2021 |

OTHER PUBLICATIONS

International Search Report dated Oct. 10, 2022, issued in corresponding International Application No. PCT/EP2022/067767 (4 pgs.).

(Continued)

*Primary Examiner* — Tinh T Dang
(74) *Attorney, Agent, or Firm* — Pillsbury Winthrop Shaw Pittman, LLP

(57)                ABSTRACT

Disclosed is a bicycle transmission ratio changing system comprising bicycle transmission, and a control unit configured to change the bicycle transmission according to an shift sequence. The shift sequence includes a synchronous shift step of synchronously changing the transmission ratio of a first transmission and the transmission ratio of a second transmission; and a non-synchronous shift step of selectively changing either the transmission ratio of the first transmission or the transmission ratio of the second transmission. The shift sequence includes at least the lower of Nor M–1 synchronous shift steps, wherein N corresponds to the number of different transmission ratios of the first transmission and M corresponds to the number of different transmission ratios of the second transmission.

22 Claims, 10 Drawing Sheets

(56) References Cited

U.S. PATENT DOCUMENTS

| | | | |
|---|---|---|---|
| 2014/0290412 A1 * | 10/2014 | Emura | B62M 25/08 |
| | | | 74/473.12 |
| 2016/0009341 A1 * | 1/2016 | Watarai | B62M 25/08 |
| | | | 701/51 |
| 2016/0167738 A1 | 6/2016 | Fukao et al. | |
| 2016/0257373 A1 | 9/2016 | Emura et al. | |
| 2017/0225743 A1 | 8/2017 | Hara | |

OTHER PUBLICATIONS

Written Opinion of the International Searching Authority dated Oct. 10, 2022, issued in corresponding International Application No. PCT/EP2022/067767 (12 pgs.).

* cited by examiner

| Chainwheel teeth | Sprocket teeth | | R1 R2 | 0.69 | | 1.00 |
|---|---|---|---|---|---|---|
| 48 | 1 | 36 | 1.33 | 0.91 | | 1.33 |
| 48 | 2 | 30 | 1.60 | 1.10 | | 1.60 |
| 48 | 3 | 17 | 2.82 | 1.94 | | 2.82 |
| 48 | 4 | 14 | 3.43 | 2.35 | | 3.43 |

P

| Chainwheel teeth | Sprocket teeth | | R1 R2 | 1.00 | | 1.30 |
|---|---|---|---|---|---|---|
| 34 | 1 | 44 | 0.77 | 0.77 | | 1.00 |
| 34 | 2 | 27 | 1.26 | 1.26 | | 1.64 |
| 34 | 3 | 16 | 2.13 | 2.13 | | 2.56 |
| 34 | 4 | 10 | 3.40 | 3.40 | | 4.42 |

P

| Chainwheel teeth | Sprocket teeth | | R1 R2 | 0.69 | | | 1.00 |
|---|---|---|---|---|---|---|---|
| 42 | 1 | 36 | 1.17 | 0.80 | | | 1.17 |
| 42 | 2 | 32 | 1.31 | 0.90 | | | 1.31 |
| 42 | 3 | 28 | 1.50 | 1.03 | | | 1.50 |
| 42 | 4 | 17 | 2.47 | 1.69 | | | 2.47 |
| 42 | 5 | 15 | 2.80 | 1.92 | | | 2.80 |
| 42 | 6 | 13 | 3.23 | 2.22 | | | 3.23 |
| 42 | 7 | 11 | 3.82 | 2.64 | | | 3.82 |

P

| Chainwheel teeth | Sprocket teeth | | R1 R2 | 0.69 | | 1.00 |
|---|---|---|---|---|---|---|
| 42 | 1 | 36 | 1.17 | 0.80 | | 1.17 |
| 42 | 2 | 32 | 1.31 | 0.90 | | 1.31 |
| 42 | 3 | 28 | 1.50 | 1.03 | | 1.50 |
| 42 | 4 | 24 | 1.75 | 1.21 | | 1.75 |
| 42 | 5 | 17 | 2.47 | 1.69 | | 2.47 |
| 42 | 6 | 15 | 2.80 | 1.92 | | 2.80 |
| 42 | 7 | 13 | 3.23 | 2.22 | | 3.23 |
| 42 | 8 | 11 | 3.82 | 2.64 | | 3.82 |

P

| Chainwheel teeth | Sprocket teeth | | R1 R2 | 1.00 | | 1.10 |
|---|---|---|---|---|---|---|
| 50 | 1 | 32 | 1.56 | 1.56 | | 1.72 |
| 50 | 2 | 26 | 1.92 | 1.92 | | 2.12 |
| 50 | 3 | 21 | 2.38 | 2.38 | | 2.62 |
| 50 | 4 | 17 | 2.94 | 2.94 | | 3.24 |
| 50 | 5 | 14 | 3.57 | 3.57 | | 3.93 |
| 50 | 6 | 12 | 4.17 | 4.17 | | 4.58 |
| 50 | 7 | 10 | 5.00 | 5.00 | | 5.50 |

P

| Chainwheel teeth | Sprocket teeth | | R1 R2 | 1.00 | | 1.13 |
|---|---|---|---|---|---|---|
| 34 | 1 | 44 | 0.77 | 0.77 | | 0.87 |
| 34 | 2 | 34 | 1.00 | 1.00 | | 1.13 |
| 34 | 3 | 27 | 1.26 | 1.26 | | 1.42 |
| 34 | 4 | 21 | 1.62 | 1.62 | | 1.83 |
| 34 | 5 | 16 | 2.13 | 2.13 | | 2.40 |
| 34 | 6 | 13 | 2.62 | 2.62 | | 2.96 |
| 34 | 7 | 10 | 3.40 | 3.40 | | 3.84 |

P

| Chainwheel teeth | Sprocket teeth | | R1 R2 | 1.00 | 1.10 | 1.20 |
|---|---|---|---|---|---|---|
| 48 | 1 | 42 | 1.14 | 1.14 | 1.25 | 1.37 |
| 48 | 2 | 32 | 1.5 | 1.5 | 1.65 | 1.80 |
| 48 | 3 | 22 | 2.18 | 2.18 | 2.40 | 2.62 |
| 48 | 4 | 14 | 3.43 | 3.43 | 3.77 | 4.12 |

P

| Chainwheel teeth | Sprocket teeth | | R1 R2 | 1 | 2 | 3 | 4 | 5 |
|---|---|---|---|---|---|---|---|---|
| 48 | 1 | 42 | 1.14 | 1.00 / 1.14 | 1.09 / 1.25 | 1.19 / 1.36 | 1.30 / 1.49 | |
| 48 | 2 | 32 | 1.50 | 1.09 / 1.63 | 1.19 / 1.78 | 1.30 / 1.94 | 1.42 / 2.12 | |
| 48 | 3 | 22 | 2.18 | 1.06 / 2.32 | 1.16 / 2.53 | 1.27 / 2.77 | 1.39 / 3.03 | 1.51 / 3.30 |
| 48 | 4 | 14 | 3.43 | 1.05 / 3.61 | 1.15 / 3.94 | 1.26 / 4.31 | 1.37 / 4.71 | 1.50 / 5.14 |

| Chainwheel teeth | Sprocket teeth | | R1 R2 | 1 | 2 | 3 | 4 | 5 |
|---|---|---|---|---|---|---|---|---|
| 48 | 1 | 42 | 1.14 | 1.00 / 1.14 | 1.12 / 1.28 | 1.26 / 1.44 | 1.41 / 1.62 | |
| 48 | 2 | 32 | 1.50 | 1.21 / 1.82 | 1.36 / 2.04 | | | |
| 48 | 3 | 22 | 2.18 | 1.05 / 2.29 | 1.18 / 2.57 | 1.32 / 2.88 | 1.48 / 3.24 | |
| 48 | 4 | 14 | 3.43 | 1.06 / 3.63 | 1.19 / 4.08 | 1.34 / 4.58 | 1.50 / 514 | |

| Chainwheel teeth | Sprocket teeth | | R1 R2 | 0.69 | | 1.00 |
|---|---|---|---|---|---|---|
| 48 | 1 | 36 | 1.33 | 0.91 | | 1.33 |
| 48 | 2 | 30 | 1.60 | 1.10 | | 1.60 |
| 48 | 3 | 17 | 2.82 | 1.94 | | 2.82 |
| 48 | 4 | 14 | 3.43 | 2.35 | | 3.43 |

Pe   Po

| Chainwheel teeth | Sprocket teeth | | R1 R2 | 1.00 | | 1.30 |
|---|---|---|---|---|---|---|
| 34 | 1 | 44 | 0.77 | 0.77 | | 1.00 |
| 34 | 2 | 27 | 1.26 | 1.26 | | 1.64 |
| 34 | 3 | 16 | 2.13 | 2.13 | | 2.56 |
| 34 | 4 | 10 | 3.40 | 3.40 | | 4.42 |

Po   Pe

| Chainwheel teeth | Sprocket teeth | | R1 R2 | 0.69 | | 1.00 |
|---|---|---|---|---|---|---|
| 42 | 1 | 36 | 1.17 | 0.80 | | 1.17 |
| 42 | 2 | 32 | 1.31 | 0.90 | | 1.31 |
| 42 | 3 | 28 | 1.50 | 1.03 | | 1.50 |
| 42 | 4 | 17 | 2.47 | 1.69 | | 2.47 |
| 42 | 5 | 15 | 2.80 | 1.92 | | 2.80 |
| 42 | 6 | 13 | 3.23 | 2.22 | | 3.23 |
| 42 | 7 | 11 | 3.82 | 2.64 | | 3.82 |

Pe

| Chainwheel teeth | Sprocket teeth | | R1 R2 | 0.69 | | 1.00 |
|---|---|---|---|---|---|---|
| 42 | 1 | 36 | 1.17 | 0.80 | | 1.17 |
| 42 | 2 | 32 | 1.31 | 0.90 | | 1.31 |
| 42 | 3 | 28 | 1.50 | 1.03 | | 1.50 |
| 42 | 4 | 17 | 2.47 | 1.69 | | 2.47 |
| 42 | 5 | 15 | 2.80 | 1.92 | | 2.80 |
| 42 | 6 | 13 | 3.23 | 2.22 | | 3.23 |
| 42 | 7 | 11 | 3.82 | 2.64 | | 3.82 |

Po

| Chainwheel teeth | Sprocket teeth | | R1 R2 | 1.00 | 1.10 |
|---|---|---|---|---|---|
| 50 | 1 | 32 | 1.56 | 1.56 | 1.72 |
| 50 | 2 | 26 | 1.92 | 1.92 | 2.12 |
| 50 | 3 | 21 | 2.38 | 2.38 | 2.62 |
| 50 | 4 | 17 | 2.94 | 2.94 | 3.24 |
| 50 | 5 | 14 | 3.57 | 3.57 | 3.93 |
| 50 | 6 | 12 | 4.17 | 4.17 | 4.58 |
| 50 | 7 | 10 | 5.00 | 5.00 | 5.50 |

Po     Pe

| Chainwheel teeth | Sprocket teeth | | R1 R2 | 1.00 | 1.13 |
|---|---|---|---|---|---|
| 34 | 1 | 44 | 0.77 | 0.77 | 0.87 |
| 34 | 2 | 34 | 1.00 | 1.00 | 1.13 |
| 34 | 3 | 27 | 1.26 | 1.26 | 1.42 |
| 34 | 4 | 21 | 1.62 | 1.62 | 1.83 |
| 34 | 5 | 16 | 2.13 | 2.13 | 2.40 |
| 34 | 6 | 13 | 2.62 | 2.62 | 2.96 |
| 34 | 7 | 10 | 3.40 | 3.40 | 3.84 |

Po     Pe

1

SYSTEM AND METHOD FOR CHANGING A BICYCLE TRANSMISSION RATIO OF A BICYCLE TRANSMISSION

CROSS-REFERENCE TO RELATED APPLICATIONS

This application is the national stage entry of PCT/EP2022/067767, filed Jun. 28, 2022, which claims priority to Netherlands Application No. 2028558, filed Jun. 28, 2021, the entire contents of each of which are herein incorporated by reference in their entireties.

FIELD

The invention relates to a system and method for changing a bicycle transmission ratio of a bicycle transmission.

BACKGROUND

Known bicycle transmissions, particularly race bicycles, include at least two front chainwheels coupled to an input, such as a crank, and a set of rear sprockets coupled to an output, typically a rear wheel of the bicycle. The front chainwheels are coupled to the rear sprockets via a chain, which selectively meshes with any one of the chainwheels and any one of the sprockets to obtain various bicycle transmission ratios between the input and the output. A front derailleur is arranged to switch the chain from one chainwheel to another, and a rear derailleur is arranged to switch the chain from one sprocket to another. An operating device, typically provided at a handlebar of the bicycle, allows the user to command a transmission ratio change by sending shift signals to the front derailleur and/or the rear derailleur.

In conventional systems, the front and rear derailleur are independently operated by means of separate shift signals. For instance, a left hand shifter only operates the front derailleur, and a right hand shifter only operates the rear derailleur. More modern systems include a control unit which can operate both the front and rear derailleurs simultaneously upon receiving a shift signal from the operating device. A control unit may contain an upshift sequence and a downshift sequence, each including a synchronous shift step at which the front and rear derailleurs are operated simultaneously upon receiving a single shift signal. At an upshift synchronous shift step, the front derailleur shifts the chain to a larger chainwheel while the rear derailleur simultaneously shifts the chain to a larger sprocket, causing a resultant increase in the bicycle transmission ratio. At a downshift synchronous shift step, the front derailleur shifts the chain to a smaller chainwheel while the rear derailleur simultaneously shifts the chain to a smaller sprocket, causing a resultant decrease in the bicycle transmission ratio.

A downside of these known modern systems is that each synchronous shift step causes a considerable downtime in which substantially no torque can be transmitted by the bicycle transmission. This downtime is particularly due to the shifting of the chain from one chainwheel to another, which is typically a large jump in bicycle transmission ratio. A large jump between front chain rings is often required for obtaining a sufficiently broad range of bicycle transmission ratios. Hence, to avoid shifting with the front derailleur, the known systems keep the number of synchronous shift steps to a bare minimum, wherein, as a result, many bicycle transmission ratios remain unused.

SUMMARY

It is an aim to provide an improved bicycle transmission ratio changing system and method. It is particularly an aim to provide an effective range of bicycle transmission ratios, and make efficient use thereof. It is also an aim to provide a system and method for efficient and user-friendly shifting through the transmission ratios of the bicycle.

According to a first aspect is provided a bicycle transmission ratio changing system comprising a first transmission selectively operable according to one of at least two different transmission ratios, e.g. exactly two. The system may comprise a first actuator for switching the first transmission between the at least two transmission ratios.

The first transmission may for example be embodied as a hub transmission housed in a, e.g. a rear, wheel hub of the bicycle. The first transmission may also be embodied as a crank transmission, housed at a crank of the bicycle. The first transmission may include a planetary gear set with at least three rotational members, such as a sun gear, a planet carrier and a ring gear. A clutch system can be used for selectively coupling two of the rotational members, e.g. the planet carrier and the ring gear. When coupled, the hub gear shifting mechanism operates e.g. according to a first gear ratio, and when decoupled according to a second gear ratio. Alternatively, or additionally, the first transmission, can be embodied as a continuously variable transmission, CVT, which is e.g. operated in certain, programmable, gear ratios. In this case the first actuator can be a CVT ratio actuator.

The system further comprises a second transmission selectively operable according to one of at least two transmission ratios.

The second transmission may for example comprise a chainwheel, a set of sprockets of varying sizes and a chain for meshing with the chainwheel and for selectively meshing with any one of the sprockets to operate the second transmission according to one of a plurality of different transmission ratios. The second transmission may comprise a second actuator for switching the chain from one sprocket to another. The second actuator may for example be a derailleur. Alternatively, or additionally, the second transmission, can be embodied as a geared transmission, e.g. inside a gearbox, configured to create multiple transmission ratios by opening or closing clutches. In this case the second actuator can be one or multiple clutch actuators. The first transmission is connected in series to the second transmission to form a bicycle transmission which is operable according to a plurality of bicycle transmission ratios. The bicycle transmission ratio is the product of the transmission ratio of the first transmission and the transmission ratio of the second transmission. Preferably, the number of different transmission ratios of the first transmission is smaller than, or equal to, the number of different transmission ratios of the second transmission. The number of different transmission ratios of the second transmission can be at least three, preferably at least four. If the bicycle transmission includes a set of sprockets of varying sizes, such as a cassette, the set of sprockets corresponds to the second transmission.

The system comprises an operating device for transmitting a first shift signal for upshifting or downshifting the bicycle transmission ratio to a next higher or next lower bicycle transmission ratio. The system further comprises a control unit configured to receive the first shift signal, and, in response to receiving the first shift signal, change the transmission ratio of the first transmission and/or change the transmission ratio of the second transmission so as to upshift or downshift the bicycle transmission ratio to the next higher or next lower bicycle transmission ratio. The control unit is configured to upshift and/or downshift the bicycle transmission ratio to the next higher or next lower bicycle transmission ratio according to an upshift sequence through the bicycle transmission ratios, and/or a downshift sequence through the bicycle transmission ratios. The upshift sequence and/or downshift sequence includes a) a synchronous shift step of synchronously changing the transmission ratio of the first transmission and the transmission ratio of the second transmission; and b) a non-synchronous shift step of selectively changing either the transmission ratio of the first transmission or the transmission ratio of the second transmission. The control unit is configured to upshift the bicycle transmission ratio to the next higher bicycle transmission ratio according to an upshift sequence through the bicycle transmission ratios. The control unit is configured to downshift the bicycle transmission ratio to the next lower bicycle transmission ratio according to a downshift sequence through the bicycle transmission ratios. The upshift sequence includes a) a synchronous shift step of synchronously changing the transmission ratio of the first transmission and the transmission ratio of the second transmission; and b) a non-synchronous shift step of selectively changing either the transmission ratio of the first transmission or the transmission ratio of the second transmission. The downshift sequence includes a) a synchronous shift step of synchronously changing the transmission ratio of the first transmission and the transmission ratio of the second transmission; and b) a non-synchronous shift step of selectively changing either the transmission ratio of the first transmission or the transmission ratio of the second transmission.

According to a first sub-aspect the number of synchronous shift steps in the upshift sequence is equal to or higher than the number of different transmission ratios according to which the first transmission is selectively operable. Alternatively, or additionally, the number of synchronous shift steps in the downshift sequence is equal to or higher than the number of different transmission ratios according to which the first transmission is selectively operable. Hence, if the first transmission is operable according to N different transmission ratios, the upshift sequence includes at least N synchronous shift steps, and/or the downshift sequence includes at least N synchronous shift steps. Hence, if the first transmission is operable according to N different transmission ratios, the upshift sequence includes at least N synchronous shift steps. Alternatively, or additionally, if the first transmission is operable according to N different transmission ratios, the downshift sequence includes at least N synchronous shift steps. This is particularly useful, but not exclusively, if the second transmission is operable according to more different transmission ratios than the first transmission. This is for instance useful if the second transmission comprises the chain and sprockets.

Hence, if the first transmission is operable according to two different transmission ratios, the upshift sequence includes at least two different synchronous shift steps, and/or the downshift sequence includes at least two synchronous shift steps, for example three synchronous steps. The first transmission may also be operable according to three transmission ratios. Hence, in case the first transmission is operable according to three different transmission ratios, the upshift sequence includes at least three synchronous shift steps, and/or the downshift sequence includes at least three synchronous shift steps.

By having at least as many synchronous shift steps in the upshift sequence and/or in the downshift sequence as operable transmission ratios of the first transmission, various ranges of bicycle transmission ratios can be obtained, with appropriate steps between successive ratios, and with little to no overlapping bicycle transmission ratios. Also, the system allows for efficient shifting sequences through the bicycle transmission ratios using the first and second transmissions. The main advantage is that the number of ratios in the second transmission can be significantly reduced. For example with only 4 sprockets, 8 or more bicycle transmission ratios can be made.

According to this sub-aspect for example the first transmission can be a clutched geared transmission and the second transmission can be a transmission using a chain and a plurality of sprockets. Alternatively, for example the first transmission can be a continuously variable transmission and the second transmission can be a transmission using a chain and a plurality of sprockets. Alternatively, for example the first transmission can be a clutched geared transmission and the second transmission can be a clutched geared transmission. Alternatively, for example the first transmission can be a continuously variable transmission, which is e.g. operated in certain, programmable, gear ratios, and the second transmission can be a clutched geared transmission.

According to a second sub-aspect the number of synchronous shift steps in the upshift sequence is equal to higher than the number of different transmission ratios according to which the second transmission is selectively operable minus one. Alternatively, or additionally, the number of synchronous shift steps in the downshift sequence is equal to or higher than the number of different transmission ratios according to which the second transmission is selectively operable minus one. Hence, if the second transmission is operable according to M different transmission ratios, the upshift sequence includes at least M–1 synchronous shift steps, and/or the downshift sequence includes at least M–1 synchronous shift steps. Hence, if the second transmission is operable according to M different transmission ratios, the upshift sequence includes at least M–1 synchronous shift steps. Alternatively, or additionally, if the second transmission is operable according to M different transmission ratios, the downshift sequence includes at least M–1 synchronous shift steps. This is particularly useful, but not exclusively, if the first transmission is operable according to more different transmission ratios than the second transmission. This is for instance useful if the first transmission is embodied as a continuously variable transmission, CVT, which is e.g. operated in certain, programmable, gear ratios. This can also be useful if the first transmission is embodied as the hub transmission or crank transmission.

By having at least as many synchronous shift steps in the upshift sequence and/or in the downshift sequence as operable transmission ratios of the second transmission minus one, various ranges of bicycle transmission ratios can be obtained, with appropriate steps between successive ratios, and with little to no overlapping bicycle transmission ratios. Also, the system allows for efficient shifting sequences through the bicycle transmission ratios using the first and second transmissions. The main advantage is that the number of ratios in the second transmission can be significantly reduced. For example with only 4 sprockets, 8 or more bicycle transmission ratios can be made.

According to this sub-aspect for example the first transmission can be a clutched geared transmission and the second transmission can be a transmission using a chain and a plurality of sprockets. Alternatively, for example the first transmission can be a continuously variable transmission, which is e.g. operated in certain, programmable, gear ratios, and the second transmission can be a transmission using a chain and a plurality of sprockets. Alternatively, for example the first transmission can be a clutched geared transmission and the second transmission can be a clutched geared transmission. Alternatively, for example the first transmission can be a continuously variable transmission, which is e.g. operated in certain, programmable, gear ratios, and the second transmission can be a clutched geared transmission.

According to a third sub-aspect the number of synchronous shift steps in the upshift sequence is equal to higher than the lower of the number of different transmission ratios according to which the first transmission is selectively operable and the number of different transmission ratios according to which the second transmission is selectively operable minus one. Alternatively, or additionally, the number of synchronous shift steps in the downshift sequence is equal to or higher than the lower of the number of different transmission ratios according to which the first transmission is selectively operable and the number of different transmission ratios according to which the second transmission is selectively operable minus one. Hence, if the first transmission is operable according to N different transmission ratios, and the second transmission is operable according to M different transmission ratios the upshift sequence includes at least the lower of N or M−1 synchronous shift steps, and/or the downshift sequence includes at least the lower of N or M−1 synchronous shift steps. Hence, if the first transmission is operable according to N different transmission ratios, and the second transmission is operable according to M different transmission ratios the upshift sequence includes at least the lower of N or M−1 synchronous shift steps. Alternatively, or additionally, if the first transmission is operable according to N different transmission ratios, and the second transmission is operable according to M different transmission ratios the downshift sequence includes at least the lower of N or M−1 synchronous shift steps. This is particularly useful, but not exclusively, if the first transmission and second transmission are operable according to the same number of different transmission ratios, e.g. differing by two, one or zero. This is for instance useful if the first transmission is embodied as a continuously variable transmission, CVT, which is e.g. operated in certain, programmable, gear ratios, and the second transmission is embodied as a chain and sprockets or geared transmission.

According to this sub-aspect for example the first transmission can be a clutched geared transmission and the second transmission can be a transmission using a chain and a plurality of sprockets. Alternatively, for example the first transmission can be a continuously variable transmission, which is e.g. operated in certain, programmable, gear ratios, and the second transmission can be a transmission using a chain and a plurality of sprockets. Alternatively, for example the first transmission can be a clutched geared transmission and the second transmission can be a clutched geared transmission. Alternatively, for example the first transmission can be a continuously variable transmission, which is e.g. operated in certain, programmable, gear ratios, and the second transmission can be a clutched geared transmission.

According to a fourth sub-aspect the number of synchronous shift steps in the upshift sequence is at least three. It has been found that by having at least three synchronous shift steps in the upshift sequence and/or in the downshift sequence, various ranges of bicycle transmission ratios can be obtained, with appropriate steps between successive ratios, and with little to no overlapping bicycle transmission ratios. Also, the system allows for efficient shifting sequences through the bicycle transmission ratios using the first and second transmissions.

According to this sub-aspect for example the first transmission can be a clutched geared transmission and the second transmission can be a transmission using a chain and a plurality of sprockets. Alternatively, for example the first transmission can be a continuously variable transmission, which is e.g. operated in certain, programmable, gear ratios, and the second transmission can be a transmission using a chain and a plurality of sprockets. Alternatively, for example the first transmission can be a clutched geared transmission and the second transmission can be a clutched geared transmission. Alternatively, for example the first transmission can be a continuously variable transmission, which is e.g. operated in certain, programmable, gear ratios, and the second transmission can be a clutched geared transmission.

The first transmission is preferably arranged to couple and/or decouple or shift under load. The second transmission is preferably also arranged to couple and/or decouple or shift under load.

Optionally, in the upshift sequence, the at least N synchronous shift steps include at least one downshift of the transmission ratio of the first transmission. Optionally, in the downshift sequence, the at least N synchronous shift steps include at least one upshift of the transmission ratio of the first transmission. This can aid in efficient shifting sequences through the bicycle transmission ratios using the first and second transmissions with little to no overlapping bicycle transmission ratios.

Optionally, in the upshift sequence and/or downshift sequence sequential synchronous shift steps include alternatingly an upshift of the transmission ratio of the first transmission and a downshift of the transmission ratio of the first transmission, or vice versa. It will be appreciated that non-synchronous shift steps may be executed between sequential synchronous shift steps. For example, successive shifting through the bicycle transmission ratios along the upshift sequence can involve a first synchronous shift step and later a second synchronous shift step, wherein the first synchronous shift step may involves an upshift of the transmission ratio of the first transmission, and the second synchronous shift step involves a downshift of the transmission ratio of the first transmission.

Optionally, the upshift sequence and/or the downshift sequence through consecutive bicycle transmission ratios includes alternatingly the synchronous shift step and the non-synchronous shift step, or vice versa. For example, successive shifting through the bicycle transmission ratios along the upshift sequence may involve a synchronous upshift step-a non-synchronous upshift step-a synchronous upshift step-a non-synchronous upshift step, etc. The control unit can for example be configured to in response to repeated upshift signals a) shift up the first transmission from the second transmission ratio to the first transmission ratio, b) shift up to the next sprocket and simultaneously shift down the first transmission from the first transmission ratio to the second transmission ratio, and c) repeat steps a) and b). Alternatively, the control unit can for example be configured to in response to repeated upshift signals a) shift up to the next higher sprocket, b) shift up the first transmission from the first transmission ratio to the second transmission ratio and simultaneously shift down to the next lower sprocket, c) shift up to the next higher sprocket, d) shift down the first transmission from the second transmission ratio to the first transmission ratio and simultaneously shift up to the next higher sprocket and e) repeat steps a), b), c) and d). It will be appreciated that downshifting can be performed in the reverse order.

Optionally, consecutive bicycle transmission ratios of the upshift sequence and/or the downshift sequence of consecutive bicycle transmission ratios includes non-alternatingly a synchronous shift step and a non-synchronous shift step. For example, successive shifting through the bicycle transmission ratios along the upshift sequence may involve a non-synchronous upshift step-a non-synchronous upshift step-a synchronous upshift step-a non-synchronous upshift step-a non-synchronous step-a synchronous step, etc. The control unit may thus e.g. be configured to in response to repeated upshift signals a) shift up the first transmission from the third transmission ratio to the second transmission ratio, b) shift up the first transmission from the second transmission ratio to the first transmission ratio, c) shift up to the next sprocket and simultaneously shift down the first transmission from the first transmission ratio to the third transmission ratio, and d) repeat steps a) b) and c).

Optionally, the upshift sequence and/or the downshift sequence is alternatingly a synchronous shift step and a non-synchronous shift step.

Optionally, the upshift sequence and/or the downshift sequence of consecutive bicycle transmission ratios includes a synchronous shift step directly followed by at least two consecutive non-synchronous shift steps, or the upshift sequence and/or the downshift sequence includes a non-synchronous shift step directly followed by at least two consecutive synchronous shift steps.

Optionally, the synchronous shift step includes upshifting or downshifting the transmission ratio of the second transmission to at most a second-next higher or second-next lower transmission ratio, preferably to at most a next higher or next lower transmission ratio. Upshifting the transmission ratio of the second transmission for example includes switching the chain to a smaller sprocket, thereby increasing the transmission ratio of the second transmission. Shifting to a next higher transmission ratio of the second transmission may thus correspond to selecting the next smaller sprocket, e.g. upshifting the chain a single sprocket to an adjacent smaller sprocket. Shifting to a second-next higher transmission ratio of the second transmission may thus correspond to selecting the next but one smaller sprocket, e.g. upshifting the chain two sprockets. Downshifting the transmission ratio of the second transmission for example includes switching the chain to a larger sprocket, thereby decreasing the transmission ratio of the second transmission. Shifting to a next lower transmission ratio of the second transmission may thus correspond to selecting the next larger sprocket, e.g. downshifting the chain a single sprocket to an adjacent larger sprocket. Shifting to a second-next lower transmission ratio of the second transmission may thus correspond to selecting the second-next larger sprocket, e.g. downshifting the chain two sprockets.

Optionally, the upshift sequence and/or the downshift sequence contains all bicycle transmission ratios. Hence, the upshift sequence can contain all bicycle transmission ratios. Hence, the downshift sequence can contain all bicycle transmission ratios.

Optionally, the upshift sequence and the downshift sequence are equal and opposite.

Optionally, the non-synchronous shift step includes maintaining the transmission ratio of the first transmission and changing the transmission ratio of the second transmission.

Optionally, a non-synchronous upshift step in the upshift sequence includes maintaining the transmission ratio of the first transmission and upshifting the transmission ratio of the second transmission, and a synchronous upshift step in the upshift sequence includes synchronously upshifting the transmission ratio of the first transmission and downshifting the transmission ratio of the second transmission.

Optionally, a non-synchronous downshift step in the downshift sequence includes maintaining the transmission ratio of the first transmission and downshifting the transmission ratio of the second transmission, and a synchronous downshift step in the downshift sequence includes synchronously downshifting the transmission ratio of the first transmission and upshifting the transmission ratio of the second transmission.

Optionally, the non-synchronous shift step includes maintaining the transmission ratio of the second transmission and changing the transmission ratio of the first transmission.

Optionally, a non-synchronous upshift step in the upshift sequence includes maintaining the transmission ratio of the second transmission and upshifting the transmission ratio of the first transmission, and a synchronous upshift step in the upshift sequence includes synchronously upshifting the transmission ratio of the second transmission and downshifting the transmission ratio of the first transmission.

Optionally, a non-synchronous downshift step in the downshift sequence includes maintaining the transmission ratio of the second transmission and downshifting the transmission ratio of the first transmission, and a synchronous downshift step in the downshift sequence includes synchronously downshifting the transmission ratio of the second transmission and upshifting the transmission ratio of the first transmission.

Optionally, all of the bicycle transmission ratios differ from one another by at least 5%, preferably at least 6%, more preferably at least 7%. Optionally, the smallest bicycle transmission ratio and the largest bicycle transmission ratio differ by more than a factor 3, preferably by more than a factor 3.5, such as more than by a factor of 4, 4.5 or 5.

Optionally, all bicycle transmission ratio steps, from any one bicycle transmission ratio to the next higher or lower bicycle transmission ratio, are, at least approximately, equal. Using the CVT as the first transmission the transmission ratios of the first transmission can be programmed. In such case it can be advantageous to program larger ratio steps in the lower ratios region and smaller ratio steps in the higher ratios region, or vice versa.

Optionally, in the upshift sequence and/or in the downshift sequence, the transmission ratios of the second transmission are traversed in a descending or ascending order only.

Optionally, the first transmission is operable according to three or various transmission ratios. When using the CVT as the first transmission, a different number of CVT transmission ratios may be used in combination with different transmission ratios of the second transmission. For example, by using the CVT as the first transmission, in combination with some transmission ratios of the second transmission only two or three different CVT ratios are used, and with other transmission ratios of the second transmission three or four or more different CVT ratios are used.

According to a second aspect is provided a bicycle transmission ratio changing system comprising a first transmission selectively operable according to at least two transmission ratios. The system may comprise a first actuator for switching the first transmission between the at least two transmission ratios. The system further comprises a second transmission, comprising a chainwheel, a set of sprockets of varying sizes and a chain for meshing with the chainwheel and for selectively meshing with any one of the sprockets to operate the second transmission according to a plurality of transmission ratios. The second transmission may comprise a second actuator for switching the chain from one sprocket to another. The second actuator may for example be a derailleur. The second actuator may also move the sprockets in axial direction combined with an axially fixed chain tensioner. Then the actuator of the first and second transmission can be located together in the hub of the rear wheel. The number of different transmission ratios of the first transmission can be smaller than, or equal to, the number of different transmission ratios of the second transmission. The number of different transmission ratios of the second transmission can be at least three, preferably at least four. If the bicycle transmission includes a set of sprockets of varying sizes, such as a cassette, the set of sprockets corresponds to the second transmission.

The first transmission is connected to the second transmission to form a bicycle transmission which is operable according to a plurality of bicycle transmission ratios.

The operating device is arranged for transmitting a second shift signal, e.g. different from the first shift signal, for changing the bicycle transmission ratio to a second-next higher or second-next lower bicycle transmission ratio, wherein the control unit is configured to receive the second shift signal, and, in response to receiving the second shift signal, change the transmission ratio of the first transmission and/or change the transmission ratio of the second transmission so as to upshift or downshift the bicycle transmission ratio to the second-next higher or second-next lower bicycle transmission ratio. The control unit is configured to upshift and/or downshift the bicycle transmission ratio to the second-next higher or second-next lower bicycle transmission ratio according to an even shift sequence through the even bicycle transmission ratios; and/or upshift and/or downshift the bicycle transmission ratio to the second-next higher or lower bicycle transmission ratio according to an odd shift sequence through the odd bicycle transmission ratios. The even and/or odd shift sequence include a synchronous shift step of synchronously changing the transmission ratio of the first transmission and the transmission ratio of the second transmission; and/or
   a non-synchronous shift step of selectively changing either the transmission ratio of the first transmission or the transmission ratio of the second transmission.

It will be appreciated that any one of the options and features described in view of one of the first aspect can be applied equally to the second aspect. In a particular embodiment, the odd and/or even shift sequence does not comprise a synchronous shift step. Optionally, if the first transmission is operable according to N transmission ratios, the odd shift sequence includes at least N synchronous shift steps, and/or the even shift sequence includes at least N synchronous shift steps.

The operating device may also be arranged for transmitting a third shift signal, e.g. different from the second or first shift signal, for changing the bicycle transmission ratio to a third-next higher or third-next lower bicycle transmission ratio, wherein the control unit is configured to receive the third shift signal, and, in response to receiving the third shift signal, change the transmission ratio of the first transmission and/or change the transmission ratio of the second transmission so as to upshift or downshift the bicycle transmission ratio to the third-next higher or third-next lower bicycle transmission ratio.

The control unit may for example be arranged to determine a current state of the first transmission and/or of the second transmission at a current time of receiving the third shift signal (and/or first shift signal and/or second shift signal), and determine a future state of the first transmission and/or of the second transmission based on the received shift signal. The control unit may further be arranged to control the first and/or second transmission in accordance with the determine future state, e.g. changing the transmission ratio(s) of the first and/or second transmissions synchronously or non-synchronously, to obtain the desired bicycle transmission ratio.

According to a further aspect is provided a bicycle comprising a bicycle transmission ratio changing system as described herein.

According to another aspect is provided a method for changing a bicycle transmission ratio of a bicycle transmission including a first transmission selectively operable according to at least two transmission ratios; and a second transmission, comprising a set of sprockets of varying sizes and a chain for selectively meshing with any one of the sprockets to operate the second transmission according to a plurality of transmission ratios; wherein the first transmission is connected to the second transmission to form a bicycle transmission which is operable according to a plurality of bicycle transmission ratios. The number of different transmission ratios of the first transmission can be smaller than, or equal to, the number of different transmission ratios of the second transmission. The number of different transmission ratios of the second transmission can be at least three, preferably at least four. If the bicycle transmission includes a set of sprockets of varying sizes, such as a cassette, the set of sprockets corresponds to the second transmission. The method includes upshifting the bicycle transmission ratio to a next higher bicycle transmission ratio according to an upshift shift sequence and/or downshifting the bicycle transmission ratio to a next lower bicycle transmission ratio according to a downshift sequence. The upshift sequence and/or the downshift sequence includes:

a synchronous shift step of synchronously changing the transmission ratio of the first transmission and the transmission ratio of the second transmission;
   a non-synchronous shift step of selectively changing either the transmission ratio of the first transmission or the transmission ratio of the second transmission.

According to a first sub-aspect, if the first transmission is operable according to N transmission ratios, the upshift sequence includes at least N synchronous shift steps, and/or the downshift sequence includes at least N synchronous shift steps.

According to a second sub-aspect, if the second transmission is operable according to M different transmission ratios, the upshift sequence includes at least M−1 synchronous shift steps, and/or the downshift sequence includes at least M−1 synchronous shift steps.

According to a third sub-aspect, if the first transmission is operable according to N different transmission ratios, and the second transmission is operable according to M different transmission ratios the upshift sequence includes at least the lower of N or M−1 synchronous shift steps, and/or the downshift sequence includes at least the lower of N or M−1 synchronous shift steps.

According to a fourth sub-aspect, the number of synchronous shift steps in the upshift sequence is at least three.

According to a further aspect is provided a bicycle transmission ratio changing system comprising a control unit; a first transmission including continuously variable transmission, CVT, wherein the controller is configured to selectively operate the CVT in one of at least two predetermined gear ratios; and a second transmission selectively operable according to one of at least two transmission ratios, wherein the control unit is configured to operate the second transmission in one of the at least two gear ratios; wherein the first transmission is connected to the second transmission to form, together, a bicycle transmission which is operable according to a plurality of bicycle transmission ratios. Using the CVT to selectively operate in one of at least two predetermined gear ratios provides the advantage that the bicycle transmission ratios can be chosen as desired. Also, the rider can be provided with a familiar feel of discrete bicycle transmission ratios.

This bicycle transmission ratio system can use one or more synchronous shift steps and/or one or more non-synchronous shift steps, e.g. as described hereinabove.

Optionally, the at least two predetermined gear ratios of the CVT are chosen at fixed values, irrespective of a selected transmission ratio of the second transmission.

Optionally, the control unit is configured to selectively operate the CVT in a first predetermined gear ratio when the second transmission is operated according to a first of its at least two gear ratios; to operate the CVT in a different, second predetermined gear ratio when the second transmission is operated according to a first of its at least two gear ratios; and to operate the CVT in a different, third predetermined gear ratio when the second transmission is operated according to a second of its at least two gear ratios. Hence, for any gear ratio of the second transmission one or more associated transmission ratios of the first transmission can be chosen as desired.

Optionally, the predetermined gear ratios of the CVT are chosen to provide a plurality of predetermined of bicycle transmission ratios. Each of the plurality of predetermined of bicycle transmission ratios can be chosen by selecting one of the transmission ratios of the second transmission, and determining an appropriate corresponding transmission ration for the CVT. The predetermined bicycle transmission ratios can be user defined. The predetermined gear ratios of the CVT can e.g. be chosen such that the plurality of predetermined of bicycle transmission ratios have a predetermined ratio step between each two consecutive bicycle transmission ratios. The predetermined ratio steps can be user defined. The predetermined gear ratios of the CVT can e.g. chosen such that the plurality of predetermined of bicycle transmission ratios have a substantially constant ratio step between each two consecutive bicycle transmission ratios. The substantially constant ratio step can be user defined.

Optionally, the controller is configured to allow the plurality of bicycle transmission ratios to be user programmable. The controller can e.g. be configured to allow the number of bicycle transmission ratios, bicycle transmission ratio values, and/or a transmission ratio step between two consecutive bicycle transmission ratios to be user programmable. The controller can be configured to allow the predetermined CVT transmission ratios to be user programmable.

Optionally, the controller includes a user interface, and/or is connectable to a device such as a mobile communications device having a user interface, for allowing the user programming.

Optionally, the control unit is configured to receive a shift signal, and, in response to receiving the shift signal, change the transmission ratio of the first transmission and/or change the transmission ratio of the second transmission so as to upshift or downshift the bicycle transmission ratio to the next higher or next lower bicycle transmission ratio.

According to an aspect is provided a bicycle comprising this bicycle transmission changing system.

It will be appreciated that any one or more of the above aspects, features and options can be combined. It will be appreciated that any one of the options described in view of one of the aspects can be applied equally to any of the other aspects. It will also be clear that all aspects, features and options described in view of the transmission systems apply equally to the method. It will also be clear that all aspects, features and options described in view of the transmission systems apply equally to the bicycle or other pedal assisted vehicle.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing:

FIGS. 7A-7B show a particular example of a bicycle transmission ratio changing system

DETAILED DESCRIPTION

Figures 1A, 1B, 1C:
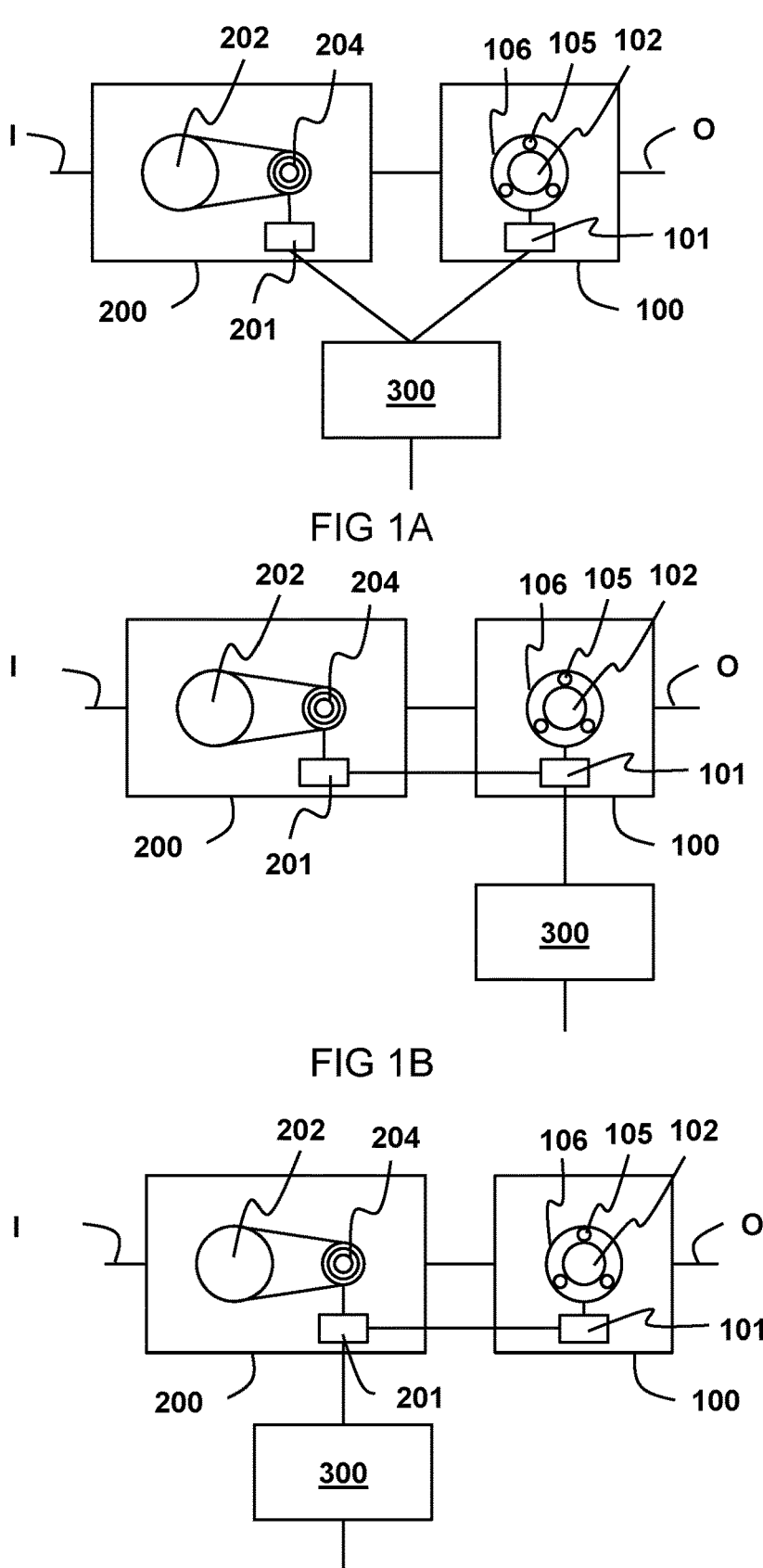
FIGS. 1A-1C show schematic layouts of a bicycle transmission ratio changing system.

FIG. 1 shows an example of a bicycle transmission ratio changing system, comprising a bicycle transmission having a first transmission 100 and a second transmission 200. The second transmission 200 comprises a chainwheel 202 and a set of sprockets 204, which are connected by a chain 206. The chain 206 meshes with the, here a single, chainwheel 202 and with any one of the sprockets of the set of sprockets 204. The set of sprockets 204 includes sprockets of various sizes.

The first 100 and second 200 transmissions are, here, connected to each other in series. In particular, the chainwheel 202 is connected to an input I of the bicycle transmission, e.g. a crank of the bicycle. The first transmission 100 is here connected between the set of sprockets 206 and an output O of the bicycle transmission, such as a rear wheel hub shell. It will be appreciated that the order of the first 100 and second 200 transmissions may be reversed. For example, the first transmission 100 may be arranged between the input I and the second transmission 200, e.g. between the crank of the bicycle and the chainwheel 202.

The second transmission 200 is selectively operable according to multiple transmission ratios. Here, the multiple transmission ratios of the second transmission 200 correspond to respective positions of the chain 206 with respect to the set of sprockets 204. Each sprocket is thus associated with a particular transmission ratio. A second actuator 201 may be provided for switching the second transmission from one transmission ratio to another. The second actuator 201 may in a particular embodiment comprise a derailleur arranged for moving the chain 206, relative to the bicycle frame, from one sprocket to another. The second actuator may 201 also be arranged to move the set of sprockets 204 relative to the bicycle frame.

The first transmission 100 is selectively operable according to at least two transmission ratios, e.g. a first transmission ratio and a second transmission ratio. In this example, the first transmission 100 is selectively operable according to two different transmission ratios. In this example, the number of different transmission ratios of the first transmission 100 is smaller than the number of different transmission ratios of the second transmission 200. A first actuator 101 may be provided for switching the first transmission 100 from the first transmission ratio to the second transmission ratio, and vice versa. In this example, the first transmission 100 comprises a planetary gear set with three rotational members: a sun gear 102, a planet carrier carrying one or more planet gears 105 and a ring gear 106. The first actuator 101 may include a clutch system for selectively coupling two of the rotational members, e.g. the planet carrier 104 and the ring gear 106. When coupled, the first transmission 100 operates e.g. according to the first transmission ratio, and when decoupled according to the second transmission ratio. The first transmission 100 is preferably configured to switch between transmission ratios under load. An example of a suitable first transmission is described in WO2018/199757A2, WO2020/085911A2, or WO2021/080431A1, incorporated herein by reference. Alternatively, or additionally, the first transmission 100 may include a continuously variable transmission, which is e.g. operated in certain, programmable, gear ratios.

The system also comprises a control unit 300. The control unit 300 is arranged for receiving a shift signal, e.g. an upshift and/or a downshift signal, from an operating device. The operating device may be manually operable by a user while riding the bicycle, and may for instance be conveniently provided at a handlebar of the bicycle.

The control unit 300 is configured to change the bicycle transmission ratio, i.e. the transmission ratio between the input I and the output O of the bicycle transmission, in response to receiving the shift signal. The control unit 300 is particularly configured to upshift the bicycle transmission ratio to the next higher bicycle transmission ratio in response to receiving an upshift signal, and to downshift the bicycle transmission ratio to a next lower bicycle transmission ratio in response to receiving a downshift signal. Upshifting through the bicycle transmission ratios is executed in accordance with an upshift sequence. The upshift sequence can include all bicycle transmission ratios consecutively. In Similarly, downshifting through the bicycle transmission ratios is executed in accordance with a down shift sequence. The downshift sequence can include all bicycle transmission ratios consecutively. The upshift sequence and downshift sequence may be predefined, and pre-programmed into the control unit. The control unit 300 for instance comprises a memory with stored therein a look-up table of the upshift sequence and/or the down shift sequence. The upshift sequence and the downshift sequence may be identical but in reverse. In other words, a path of upshifting through the bicycle transmission ratios may the same as a path of downshifting through the bicycle transmission ratios, but in reverse order.

The upshift sequence and/or the downshift sequence includes a synchronous shift step of synchronously changing the transmission ratio of the first transmission 100 and the transmission ratio of the second transmission 200. Hence, in the synchronous shift step, the first 100 and second 200 transmission, at least approximately, simultaneously change their respective transmission ratio. It will be appreciated that shifting gears "synchronously" in practice includes a time-margin of ±0.5 seconds, such as ±0.2 seconds or ±0.1 seconds. In some cases it may be intentional to first actuate the first transmission device and with a small delay thereafter actuate the second transmission device or vice versa. This could improve the shift-experience by the rider. It could also be that one shift actuator is activated faster and the other shift actuator is activated slower. It could also be that one of the actuators is actuated first and that based on the response of this actuator and/or the ratio change involved the other actuator is actuated sequentially.

The upshift sequence and/or downshift sequence also includes a non-synchronous shift step of selectively changing either the transmission ratio of the first transmission or the transmission ratio of the second transmission. Hence, in the non-synchronous shift step, the current transmission ratio of one of the first 100 and second 200 transmissions is maintained, whereas the other one of the first 100 and second 200 transmissions is controlled to change its transmission ratio.

In this example, the control unit 300 is configured such that the number of synchronous shift steps in the upshift sequence is equal to or higher than the number of different transmission ratios according to which the first transmission is selectively operable. Alternatively, or additionally, control unit 300 is configured such that the number of synchronous shift steps in the downshift sequence is equal to or higher than the number of different transmission ratios according to which the first transmission is selectively operable. Thus, if the first transmission is operable according to N transmission ratios, the upshift sequence includes at least N synchronous shift steps, and/or the downshift sequence includes at least N synchronous shift steps. Hence, in this example, the first transmission 100 has two transmission ratios, i.e. a first and a second transmission ratio, yielding the upshift sequence to include at least two synchronous shift steps, and/or the downshift sequence to include at least two synchronous shift steps.

In this example it can also apply that the control unit 300 is configured such that the number of synchronous shift steps in the upshift sequence is equal to or higher than the number of different transmission ratios according to which the second transmission is selectively operable minus one. Alternatively, or additionally, control unit 300 can be configured such that the number of synchronous shift steps in the downshift sequence is equal to or higher than the number of different transmission ratios according to which the second transmission is selectively operable minus one. Thus, if the second transmission is operable according to M transmission ratios, the upshift sequence can include at least M−1 synchronous shift steps, and/or the downshift sequence can include at least M−1 synchronous shift steps. Hence, in this example, the second transmission 200 has four transmission ratios, i.e. a first, second, third and fourth transmission ratio, yielding the upshift sequence to include at least three synchronous shift steps, and/or the downshift sequence to include at least three synchronous shift steps. Optionally, the upshift sequence includes at least the lower of N or M−1 synchronous shift steps. Optionally, the downshift sequence includes at least the lower of N or M−1 synchronous shift steps.

FIG. 1A shows an example where the control unit 300 is communicatively connected to both the first transmission 100 and the second transmission 200. In this example, the control unit 300 receives a shift signal from an operating device, and in response, communicates with the first transmission 100, e.g. with the first actuator 101, and communicates with the second transmission 200, e.g. with the second actuator 201. There can be one control unit 300 that directly controls the different actuators. Optionally there can be a feedback signal from the actuator(s) and/or sensors to the control unit that indicate the state of the transmission and/or its transmission ratio. The first and second transmissions 100, 200 need not be communicatively connected to one another, but they can optionally be, e.g. to communicate a state of the transmissions.

FIGS. 1B and 1C show examples where the control unit 300 is communicatively connected to only one of the transmissions 100, 200. In FIG. 1B, the control unit 300 is connected only to the first transmission 100, and not to the second transmission 200. FIG. 1C shows an alternative example where the control unit 300 is connected only to the second transmission 200, and not to the first transmission 100. In these two examples, the first and second transmissions 100, 200 are communicatively connected. In the example of FIG. 1B, the control unit 300 communicates with the first transmission 100, e.g. with the first actuator 101, wherein the first transmission 100 in turn communicates with the second transmission, e.g. with the second actuator 201. Conversely, in the example of FIG. 1C, the control unit 300 communicates with the second transmission 200, e.g. with the second actuator 201, wherein the second transmission 200, in turn communicates with the first transmission 100, e.g. with the first actuator 101.

Figures 2A, 2B, 2C:
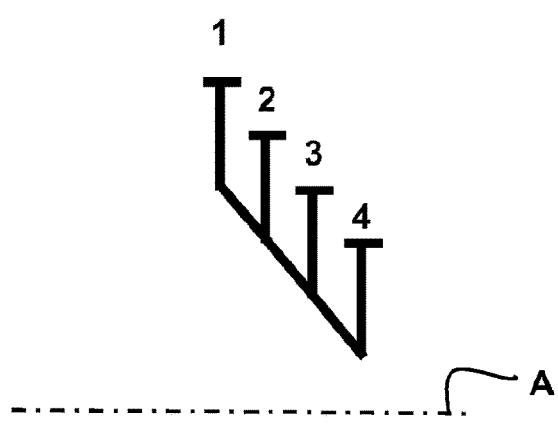
FIGS. 2A-2C show a particular example of a bicycle transmission ratio changing system.

FIG. 2A shows a schematic example of set of sprockets 204 of the second transmission 200. The set 204 includes in this example four sprockets 1,2,3,4, arranged in order of size. The sprockets are rotatable about an axis A. In the FIG. 2A only one half of the sprockets is schematically shown in cross section. Here sprocket 1 corresponds to the largest sprocket of the set 204, and sprocket 4 to the smallest sprocket.

FIG. 2B shows a schematic shift sequence through the bicycle transmission ratios, for a particular set of sprockets as shown in FIG. 2A. Here, sprocket 1 has 36 teeth, sprocket 2 has 30 teeth, sprocket 3 has 17 teeth and sprocket 4 has 14 teeth in this example. The chainwheel 202 has 48 teeth in this example. Meshing the chain 206 with the chainwheel 202 and with any one of the sprockets 1,2,3,4, provides the second transmission with four different selectively operable transmission ratios. These transmission ratios could also be made with a geared transmission, either being in the rear hub or close to the crank position or can be a combination of sprockets and a geared transmission. The transmission ratios of the second transmission 200 are denoted by R2 in FIG. 2B. Hence, in this example, sprocket 1 associates with a transmission ratio of 1.33, sprocket 2 with a transmission ratio of 1.60, sprocket 3 with a transmission ratio of 2.82, and sprocket 4 with a transmission ratio of 3.43.

The first transmission 100 is in this example selectively operable according to two different transmission ratios, here 0.69 and 1.00, denoted by R1 in FIG. 2B. Hence, the number of different transmission ratios of the first transmission 100 is smaller than the number of different transmission ratios of the second transmission 200.

Resultant bicycle transmission ratios, formed by the combinations of the transmission ratio of the first transmission and the transmission ratio of the second transmission, are also shown in FIG. 2B.

The control unit 300 is arranged to upshift through the bicycle transmission ratios according to a predefined upshift sequence, which upshift sequence is denoted in FIG. 2B by the arrow P. In this example, upshift sequence is equal to the downshift sequence with opposite direction.

The upshift sequence in this example includes all obtainable bicycle transmission ratios, ordered from smallest to largest. The downshift sequence, here, thus includes all obtainable bicycle transmission ratios ordered from largest to smallest.

The control unit 300 is configured to control each transmission 100, 200 in such way that upon each upshift signal the bicycle transmission ratio shifts up to the next higher bicycle transmission ratio.

The following example is given in view of the upshift sequence, but it will be appreciated that the same applies mutatis mutandis for the downshift sequence.

Starting from the lowest bicycle transmission ratio, corresponding the first transmission operating according to its lowest transmission ratio, here 0.69, and the second transmission operating according to its lowest transmission ratio, here 1.33, (bicycle transmission ratio 0.91) a first upshift step according to the upshift sequence is a non-synchronous upshift step. Here the non-synchronous upshift step involves upshifting the second transmission to the next higher transmission ratio of the second transmission, here 1.60, while maintaining the first transmission in its lowest transmission ratio (bicycle transmission ratio 1.10). Upshifting the second transmission here corresponds to shifting the chain 206 to a smaller sprocket. In this case, upshifting the second transmission ratio to a next higher transmission ratio corresponds to shifting the chain 206 from the largest sprocket 1 to the adjacent second largest sprocket 2.

A second upshift step in accordance with the upshift sequence is a synchronous upshift step, in which the first transmission 100 shifts up one ratio, here to a ratio of 1.00, and the second transmission 200 shifts down one ratio, here to a ratio 1.33 (bicycle transmission ratio 1.33). The bicycle transmission ratio resultant from this synchronous upshift step has increased accordingly to the next higher bicycle transmission ratio.

A third upshift step in accordance with the upshift sequence is another non-synchronous upshift step, similar to the first upshift step, wherein the first transmission is maintained in its largest transmission ratio, and the second transmission is upshifted to sprocket 3 (bicycle transmission ratio 1.60).

A fourth upshift step in accordance with the upshift sequence is a second synchronous upshift step, in which the first transmission 100 shifts down one ratio, here to a ratio of 0.69, and the second transmission 200 shifts up one ratio, here to sprocket 2 at a ratio of 2.82 (bicycle transmission ratio 1.94).

A fifth upshift step in accordance with the upshift sequence is a non-synchronous upshift step. Here the non-synchronous upshift step involves upshifting the second transmission to the next higher transmission ratio of the second transmission, here 3.43, while maintaining the first transmission in its lowest transmission ratio (bicycle transmission ratio 2.35).

A sixth upshift step in accordance with the upshift sequence is a third synchronous upshift step, in which the first transmission 100 shifts up one ratio, here to a ratio of 1.00, and the second transmission 200 shifts down one ratio, here to a ratio 2.82 (bicycle transmission ratio 2.82).

A seventh upshift step in accordance with the upshift sequence is another non-synchronous upshift step, similar to the first upshift step, wherein the first transmission is maintained in its largest transmission ratio, and the second transmission is upshifted to sprocket 1 (bicycle transmission ratio 3.43).

Hence, in this example, the upshift sequence is alternatingly a non-synchronous upshift step and a synchronous upshift step. Simply put: non-synchronous-synchronous-non-synchronous-synchronous-etc. Similarly, in this example, the downshift sequence is alternatingly a non-synchronous downshift step and a synchronous downshift step. More specifically, each of the non-synchronous shift steps in this example involves maintaining the first transmission in its current transmission ratio, and changing the transmission ratio of the second transmission. The upshift and the downshift sequence each include three synchronous shift steps.

In another example, shown in FIG. 2C, the shift sequence includes repeatedly: shifting only the first transmission-shifting both transmissions synchronously-etc. Also in this example, the shift sequence is alternatingly a non-synchronous shift step and a synchronous shift step.

In the example of FIG. 2B, the transmission ratios of the first transmission and the transmission ratios of the second transmission are adapted to one another to obtain a set of, in this case 8, unique bicycle transmission ratios. The obtained bicycle transmission ratios differ from each other, in this example, at least 5%, more particularly at least 17%. Here, a difference between any one bicycle transmission ratio and its next higher or lower transmission ratio is at least 17%, and at most 18% providing equal steps between bicycle transmission ratios, and a broad range. The ratio steps can be altered by changing the transmission ratios of the first and second transmission, respectively.

In the examples of FIGS. 2A, 2B and 2C the number of transmission ratios, N, of the first transmission is two and the number of transmission ratios, M, of the second transmission is four. Hence, N and M are about equal, in that they differ by only two. In these examples the number of synchronous shift steps, S, is three, i.e. larger than N, and equal to M−1.

Figures 3A, 3B:
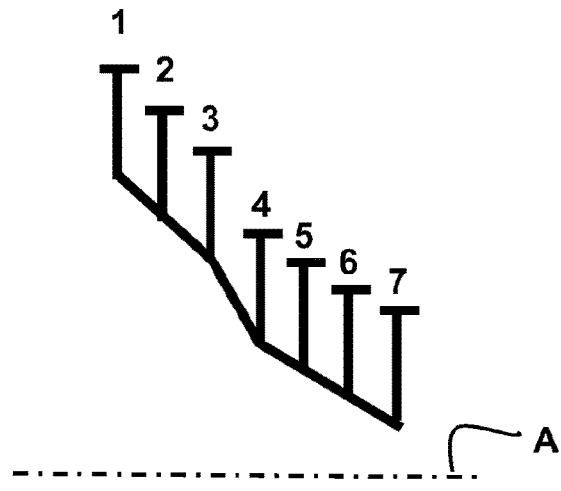
FIGS. 3A-3B show a particular example of a bicycle transmission ratio changing system.

FIG. 3A shows an example in which the set of sprockets 204 of the second transmission 200 comprises seven different sprockets, 1-7. With the first transmission 100 being selectively operable according to two different transmission ratios, this example provides 14 unique bicycle transmission ratios. The upshift sequence and the downshift sequence in this example includes thirteen bicycle transmission ratios. The upshift sequence is indicated by the arrow P. The downshift sequence is in this example equal but opposite to the upshift sequence. The shift sequence includes at least three synchronous shift steps.

In the example of FIG. 3B, the shift sequence is non-alternatingly a synchronous upshift step and a non-synchronous upshift step. In particular, starting from the smallest bicycle transmission ratio, here 0.80, the upshift sequence includes a non-synchronous upshift step directly followed by another non-synchronous upshift step directly followed by a synchronous upshift step. Simply put: non-synchronous-non-synchronous-synchronous-etc. More particular, each of the non-synchronous shift steps involves maintaining the first transmission in its current transmission ratio, and changing the transmission ratio of the second transmission.

In the example of FIG. 3B the number of transmission ratios, N, of the first transmission is two and the number of transmission ratios, M, of the second transmission is seven.

Hence, M is larger than N, here by more than two. In this example the number of synchronous shift steps, S, is three, i.e. larger than N.

Figures 4A, 4B:
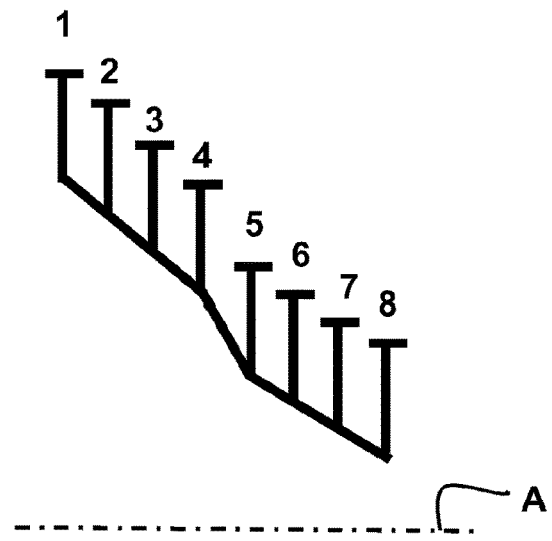
FIGS. 4A-4B show a particular example of a bicycle transmission ratio changing system.

FIGS. 4A, 4B show an example of an eight-ratios second transmission, e.g. wherein the second transmission includes a set of eight sprockets 1-8. The shift sequence is similar to the example of FIGS. 3A, 3B, but wherein an additional sprocket is provided. The additional sprocket in FIG. 4A, with respect to FIG. 4, is sprocket 4 having 24 teeth. This sprocket provides an intermediate step between the 28 teeth sprocket and the 17 teeth sprocket to facilitate shifting. This allows to change the number of non-synchronous shifts repeatedly after each other.

Figures 5A, 5B, 5C:
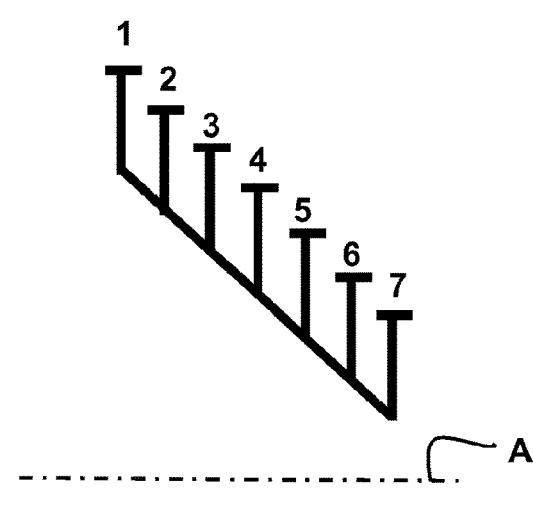
FIGS. 5A-5C show a particular example of a bicycle transmission ratio changing system.

In the example of FIGS. 5A-5C, the shift sequence includes alternatingly a synchronous upshift step and a non-synchronous upshift step. In particular, starting from the smallest bicycle transmission ratio, the upshift sequence includes a synchronous upshift step directly followed by a non-synchronous upshift step. Simply put: synchronous-non-synchronous-synchronous-synchronous-non-synchronous-etc. More particular, each of the non-synchronous shift steps involves maintaining the second transmission in its current transmission ratio, and changing the transmission ratio of the first transmission. The particular transmission ratios of the example of FIG. 5B are for example suitable for road race cycling. Other transmission ratios are also possible. An example, e.g. more suited for mountain biking, is given in FIG. 5C.

In the examples of FIGS. 5B and 5C the number of transmission ratios, N, of the first transmission is two and the number of transmission ratios, M, of the second transmission is seven. Hence, M is larger than N, here by five. In this example the number of synchronous shift steps, S, is six, i.e. larger than N and equal to M−1.

Figures 6A, 6B:
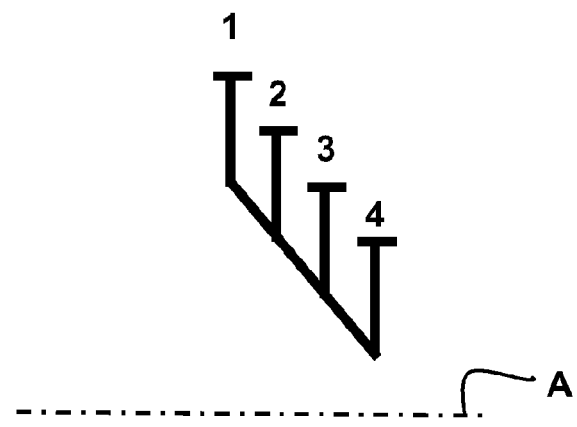
FIGS. 6A-6B show a particular example of a bicycle transmission ratio changing system.

FIGS. 6A and 6B show example in which the first transmission 100 is operable according to three transmission ratios, e.g. a first, a second and a third transmission ratio. The first transmission 100 may particularly comprise a continuously variable transmission (CVT), which, in this case, is programmed to be operable according to three different transmission ratios. In combination with the second transmission being operable according to four different transmission ratios, a twelve-speed bicycle transmission is obtained. Here, the second transmission includes a set of four different sprockets, with relatively large size differences between the sprockets to increase the range of bicycle transmission ratios. With the first transmission 100, e.g. the CVT, intermediate transmission ratios, intermediate between the transmission ratios of the second transmission, are obtained in this example. The CVT may be operable according to further transmission ratios, e.g. a fourth, fifth, sixth transmission ratio, etc. In an example, the CVT is operable according any transmission ratio within a predetermined range of e.g. 1 to for example 1.5. The CVT can be a ratcheting type of CVT, e.g. using freewheel or one-way drive modules, for instance as described in PCT/EP2020/060920. The CVT can be controlled to selectively operate at one of two or three (or more) distinct transmission ratios within the range of e.g. 1 to 1.5. The transmission ratios of the CVT can be adapted such that a step between each consecutive bicycle transmission ratios is equal or is following the programmed or selected steps by the user.

In this example, The shift sequence includes non-alternatingly a non-synchronous shift step and a synchronous shift step. Starting from the lowest bicycle transmission ratio, here 1.14, the upshift sequence includes a non-synchronous shift step, directly followed by another non-syn-
chronous shift step, directly followed by a synchronous shift
step, etc. . . .

The control unit 300 can further be arranged to receive a
second shift signal for changing the bicycle transmission
ratio to a second-next higher or second-next lower bicycle
transmission ratio. The second-next higher or second-next
lower transmission ratio corresponds to a larger ratio step
than the next transmission ratio. The operating device may
be arranged to send a signal to the control unit 300 for
upshifting and/or downshifting the bicycle transmission
ratio to the second-next higher or second-next lower trans-
mission ratio. Such shift signal may for example be gener-
ated by a double actuation, long actuation, dedicated switch
etc. . . .

The control unit 300 may be arranged to control the first
and second transmission 100, 200 according to an odd shift
sequence, in case the current bicycle transmission ratio is an
odd transmission ratio, or an even shift sequence in case the
current bicycle transmission ratio is an even transmission
ratio. Odd bicycle transmission ratios in this regard include
the first, third, fifth, seventh, ninth, etc, bicycle transmission
ratio. Hence, the odd shift sequence for example includes
shift steps between bicycle transmission ratios from the first
to the third, third to the fifth, fifth to the seventh, etc, and
vice versa. Even bicycle transmission ratios in this regard
include the second, fourth, sixth, eighth, tenth, etc, bicycle
transmission ratio. Hence, the even shift sequence for
example includes shift steps between bicycle transmission
ratios from the second to the fourth, fourth to the sixth, sixth
to the eighth, etc, and vice versa. Optionally, if the first
transmission 100 is operable according to N transmission
ratios, the odd shift sequence includes at least N synchro-
nous shift steps, and/or the even shift sequence includes at
least N synchronous shift steps. Similar to the shift
sequences for shifting to the next bicycle transmission ratio,
the odd and/or even shift sequences may include synchro-
nous shift steps and non-synchronous shift steps. The odd
shift sequence may include alternatingly or non-alternat-
ingly a synchronous shift step and non-synchronous shift
step. The even shift sequence may also include alternatingly
or non-alternatingly a synchronous shift step and non-
synchronous shift step.

The control unit 300 may for example be configured to
determine a current state of the first transmission and/or a
current state of the second transmission at a time of receiv-
ing the shift signal, and control the first and second trans-
missions in accordance with the appropriate even or odd
shift sequence.

In the example of FIG. 6B the number of transmission
ratios, N, of the first transmission is three and the number of
transmission ratios, M, of the second transmission is four.
Hence, N and M are about equal, in that they differ by only
two. In this example the number of synchronous shift steps,
S, is three, i.e. equal to N and equal to M−1.

In the example of FIGS. 6A, 6B the first, second and third
transmission ratios of the first transmission 100 embodied as
the CVT, were chosen at fixed values, irrespective of the
chosen sprocket. FIG. 7A gives an example, where the first,
second, third, fourth and fifth transmission ratio of the CVT
are each time selected such that a ratio step between two
consecutive bicycle transmission ratios is 9%. In FIG. 7A,
the columns headed 1, 2, 3, 4, 5 indicate the specific
transmission ratio of the CVT in the left upper corner of each
cell, and the corresponding bicycle transmission ratio in the
center of each cell. In this example, the four sprockets in
combination with the CVT provide a bicycle transmission having eighteen different bicycle transmission ratios, all
distributed such that a ratio step between two consecutive
bicycle transmission ratios is 9%. Of course a different
number of bicycle transmissions and/or a different, or even
unequal, ratio step between consecutive bicycle transmis-
sion ratios can be chosen.

FIG. 7B shows an example wherein the transmission
ratios of the CVT are chosen such that the four sprockets in
combination with the CVT provide a bicycle transmission
having fourteen different bicycle transmission ratios, all
distributed such that a ratio step between two consecutive
bicycle transmission ratios is 12%.

It will be appreciated that hardware, here the four sprock-
ets and the CVT, can be identical in the examples of FIGS.
6B, 7A and 7B. The difference lies in how the first and
second transmission are controlled. The control unit 300 can
be arranged to be user programmable.

The user can be enabled to modify the transmission
sequence of the bicycle transmission by storing a desired
transmission sequence in the control unit. Thereto the user
can use a user interface of the control unit 300, or e.g. of a
mobile communications device such as a smart phone, e.g.
running a dedicated app. The user can for instance set the
number of different bicycle transmission ratios, transmission
ratio values for the bicycle transmission ratios, transmission
ratio steps between consecutive bicycle transmission ratios,
etc.

In the example of FIG. 7A the number of transmission
ratios, N, of the first transmission is five and the number of
transmission ratios, M, of the second transmission is four.
Hence, N and M are about equal, in that they differ by only
one. In this example the number of synchronous shift steps,
S, is three, i.e. equal to M−1. In the example of FIG. 7B the
number of transmission ratios, N, of the first transmission is
four and the number of transmission ratios, M, of the second
transmission is four. Hence, N and M are equal. In this
example the number of synchronous shift steps, S, is three,
i.e. equal to M−1.

Figures 8A, 8B, 8C:
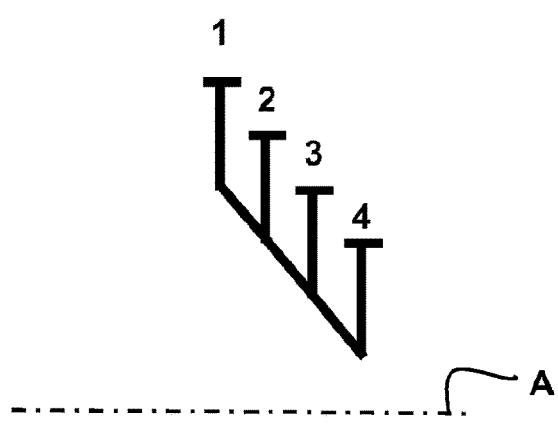
FIGS. 8A-8C show a particular example of a bicycle transmission ratio changing system.

FIGS. 8A, 8B, 8C correspond to the arrangement as
shown in FIGS. 2A, 2B, 2C, and shows an odd shift
sequence Po and an even shift sequence Pe. The direction of
the arrows indicate an upshift direction. Corresponding
downshift directions are, here, in opposite direction. In the
exemplary arrangement of FIG. 8C, the odd and even shift
sequences do not include a synchronous shift step. Hence,
upshifting the bicycle transmission ratio to the second-next
higher transmission ratio only includes upshifting the second
transmission to the next higher transmission ratio, e.g.
upshifting a single sprocket. Similarly, downshifting the
bicycle transmission ratio to the second-next lower trans-
mission ratio only includes downshifting the second trans-
mission to the next lower transmission ratio, e.g. downshift-
ing a single sprocket.

Figures 9A, 9B, 9C:
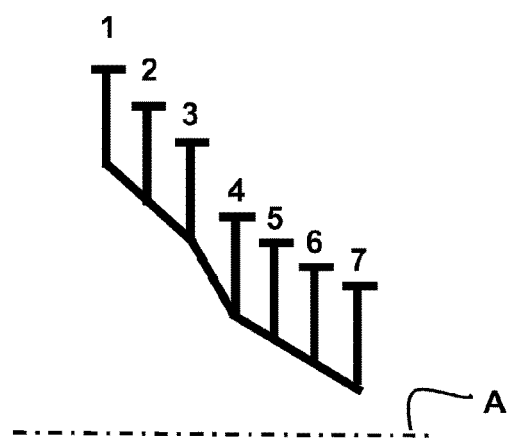
FIGS. 9A-9C show a particular example of a bicycle transmission ratio changing system.

FIGS. 9A, 9B, 9C correspond to the arrangement as
shown in FIGS. 3A and 3B, wherein FIG. 9B shows an even
shift sequence Pe and FIG. 9C shows an odd shift sequence
Po. The direction of the arrows indicate an upshift direction.
Corresponding downshift directions are, here, in opposite
direction.

Figures 10A, 10B, 10C:
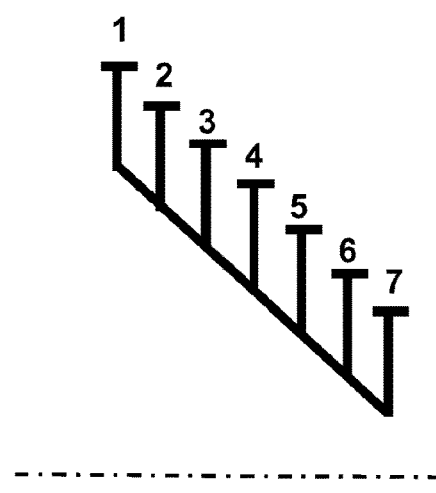
FIGS. 10A-10C show a particular example of a bicycle transmission ratio changing system.

FIGS. 10A and 10B correspond to the arrangement as
shown in FIGS. 4A and 4B, and shows an odd shift sequence
Po and an even shift sequence Pe. The direction of the
arrows indicate an upshift direction. Also here, upshifting
the bicycle transmission ratio to the second-next higher
transmission ratio only includes upshifting the second trans-
mission to the next higher transmission ratio, e.g. upshifting
a single sprocket. Similarly, downshifting the bicycle transmission ratio to the second-next lower transmission ratio only includes downshifting the second transmission to the next lower transmission ratio, e.g. downshifting a single sprocket.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged. The second transmission may be an gearbox instead of an sprocket chain system. All transmissions may be split over the crank side and rear wheel side of the bicycle or positioned all together at hub or crank side.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A bicycle transmission ratio changing system comprising:
a first transmission selectively operable according to one of N different transmission ratios, N being at least two;
a second transmission selectively operable according to M different transmission ratios, M being at least three, M being larger than N;
wherein the first transmission is connected to the second transmission to form, together, a bicycle transmission which is operable according to a plurality of bicycle transmission ratios; and
a control unit configured to receive a first shift signal for upshifting or downshifting a bicycle transmission ratio to a next higher or next lower bicycle transmission ratio, and, in response to receiving the first shift signal, change a transmission ratio of the first transmission and/or change a transmission ratio of the second transmission so as to upshift or downshift the bicycle transmission ratio to the next higher or next lower bicycle transmission ratio,
wherein the control unit is configured to upshift and/or downshift the bicycle transmission ratio to the next higher or next lower bicycle transmission ratio according to an upshift sequence through the bicycle transmission ratios, and/or a downshift sequence through the bicycle transmission ratios, and wherein the upshift sequence and/or downshift sequence includes synchronous shift steps and non-synchronous shift steps, wherein the non-synchronous upshift steps in the upshift sequence include maintaining the transmission ratio of the second transmission and upshifting the transmission ratio of the first transmission, and wherein the synchronous upshift steps in the upshift sequence include synchronously upshifting the transmission ratio of the second transmission and downshifting the transmission ratio of the first transmission, wherein, in the upshift sequence and/or in the downshift sequence, the transmission ratios of the second transmission are traversed in a descending or ascending order only, wherein the upshift sequence includes at least the lower of N or M–1 synchronous shift steps, and/or the downshift sequence includes at least the lower of N or M–1 synchronous shift steps.

2. The system of claim 1, wherein the downshift sequence is configured such that in the downshift sequence, at least one of the synchronous shift steps includes at least one upshift of the transmission ratio of the first transmission.

3. The system of claim 1, wherein the upshift sequence and/or the downshift sequence is configured such that consecutive bicycle transmission ratios include alternatingly the synchronous shift step and the non-synchronous shift step, or vice versa.

4. The system of claim 1, wherein the upshift sequence and/or the downshift sequence is configured such that consecutive bicycle transmission ratios are formed by alternatingly a synchronous shift step and a non-synchronous shift step.

5. The system of claim 1, wherein the upshift sequence and/or the downshift sequence is configured such that consecutive bicycle transmission ratios includes non-alternatingly the synchronous shift step and the non-synchronous shift step.

6. The system of claim 5, wherein the upshift sequence and/or the downshift sequence is configured such that consecutive bicycle transmission ratios includes a synchronous shift step directly followed by at least two consecutive non-synchronous shift steps, or wherein the upshift sequence and/or the downshift sequence is configured such that consecutive bicycle transmission ratios includes a non-synchronous shift step directly followed by at least two consecutive synchronous shift steps.

7. The system of claim 1, wherein the synchronous shift step includes upshifting or downshifting the transmission ratio of the second transmission to at most a second-next higher or second-next lower transmission ratio, preferably to at most a next higher or next lower transmission ratio.

8. The system of claim 1, wherein the upshift sequence and/or the downshift sequence contains all bicycle transmission ratios.

9. The system of claim 1, wherein the upshift sequence and the downshift sequence are equal and opposite.

10. The system of claim 1, wherein all of the bicycle transmission ratios differ from one another by at least 5%.

11. The system of claim 1, wherein, the upshift sequence is configured such that the transmission ratios of the second transmission are traversed in an ascending order only and/or wherein, the downshift sequence is configured such that the transmission ratios of the second transmission are traversed in a descending order only.

12. The system of claim 1, wherein the upshift sequence and/or the downshift sequence is configured to be alternatingly a synchronous shift step and a non-synchronous shift step.

13. The system of claim 1, wherein the upshift sequence and/or the downshift sequence is not alternatingly a synchronous shift step and a non-synchronous shift step.

14. The system of claim 1, wherein the first transmission is housed at a crank or at a wheel hub.

15. The system of claim 1, wherein the first transmission is a continuously variable transmission.

16. The system of claim 1, wherein the first transmission includes at least a 1:1 transmission ratio.

17. The system of claim 1, wherein the first transmission includes at least one speed increasing or speed decreasing transmission ratio.

18. The system of claim 1, wherein the second transmission includes a set of sprockets of varying sizes or a cassette.

19. The system of claim 1, further comprising an operating device arranged for transmitting a shift signal for changing the bicycle transmission ratio to a second-next higher or second-next lower bicycle transmission ratio, and wherein the control unit is configured to receive the shift signal, and, in response to receiving the shift signal, change the transmission ratio of the first transmission and/or change the transmission ratio of the second transmission so as to upshift or downshift the bicycle transmission ratio to the second-next higher or second-next lower bicycle transmission ratio, wherein the control unit is configured to:

upshift and/or downshift the bicycle transmission ratio to the second-next higher or second-next next lower bicycle transmission ratio according to an even shift sequence through the even bicycle transmission ratios, and/or upshift and/or downshift the bicycle transmission ratio to the second-next higher or second-next lower bicycle transmission ratio according to an odd shift sequence through the odd bicycle transmission ratios, wherein the even and/or odd shift sequence includes the synchronous shift step of synchronously changing the transmission ratio of the first transmission and the transmission ratio of the second transmission; and/or the non-synchronous shift step of selectively changing either the transmission ratio of the first transmission or the transmission ratio of the second transmission.

20. A bicycle comprising a bicycle transmission changing system according to claim 1.

21. A bicycle transmission ratio changing system comprising:

a first transmission selectively operable according to one of at least two transmission ratios;

a second transmission selectively operable according to one of at least two transmission ratios;

wherein the first transmission is connected to the second transmission to form, together, a bicycle transmission which is operable according to a plurality of bicycle transmission ratios; and a control unit configured to receive a shift signal for upshifting or downshifting a bicycle transmission ratio to a next higher or next lower bicycle transmission ratio, and, in response to receiving the first shift signal, change the transmission ratio of the first transmission and/or change the transmission ratio of the second transmission so as to upshift or downshift the bicycle transmission ratio to the next higher or next lower bicycle transmission ratio, wherein the control unit is configured to upshift and/or downshift the bicycle transmission ratio to the next higher or next lower bicycle transmission ratio according to an upshift sequence through the bicycle transmission ratios, and/or a downshift sequence through the bicycle transmission ratios, and wherein the upshift sequence and/or downshift sequence includes synchronous shift steps and non-synchronous shift steps, wherein the non-synchronous upshift steps in the upshift sequence include maintaining the transmission ratio of the second transmission and upshifting the transmission ratio of the first transmission, and wherein the synchronous upshift steps in the upshift sequence include synchronously upshifting the transmission ratio of the second transmission and downshifting the transmission ratio of the first transmission, wherein, in the upshift sequence and/or in the downshift sequence, the transmission ratios of the second transmission are traversed in a descending or ascending order only, wherein the upshift sequence includes at least three synchronous shift steps, and/or the downshift sequence includes at least three synchronous shift steps.

22. A method for changing a bicycle transmission ratio of a bicycle transmission including a first transmission selectively operable according to one of N different transmission ratios, N being at least two; and a second transmission selectively operable according to one of M different transmission ratios, M being at least three, M being larger than N; wherein the first transmission is connected to the second transmission to form, together, a bicycle transmission which is operable according to a plurality of bicycle transmission ratios; the method including upshifting a bicycle transmission ratio to a next higher bicycle transmission ratio according to an upshift shift sequence and/or downshifting the bicycle transmission ratio to a next lower bicycle transmission ratio according to a downshift sequence, wherein the upshift sequence and/or the downshift sequence includes synchronous shift steps and non-synchronous shift steps, wherein the non-synchronous upshift steps in the upshift sequence include maintaining the transmission ratio of the second transmission and upshifting the transmission ratio of the first transmission, and wherein the synchronous upshift steps in the upshift sequence include synchronously upshifting the transmission ratio of the second transmission and downshifting the transmission ratio of the first transmission, wherein, in the upshift sequence and/or in the downshift sequence, the transmission ratios of the second transmission are traversed in a descending or ascending order only, wherein the upshift sequence includes at least the lower of N or M−1 synchronous shift steps, and/or the downshift sequence includes at least the lower of N or M−1 synchronous shift steps.

* * * * *